United States Patent
Brown et al.

[11] Patent Number: 6,137,874
[45] Date of Patent: Oct. 24, 2000

[54] METHOD OF USING CARRIER INFORMATION FOR ENHANCED CALL DATA PROCESSING BY A TELECOMMUNICATIONS PROVIDER

[75] Inventors: Norris Brown, Freehold; Gerhard Buhler, Little Silver; Yen-Ching Wendy Chen, Lincroft; Charles Grayson, Somerset; Belkacem Manseur, Tinton Falls, all of N.J.

[73] Assignee: AT&T Corp., New York, N.Y.

[21] Appl. No.: 08/868,408

[22] Filed: Jun. 3, 1997

[51] Int. Cl.[7] .............................. H04M 7/00; H04M 3/38; H04M 3/42
[52] U.S. Cl. ......................... 379/220; 379/207; 379/222; 379/229
[58] Field of Search ..................................... 379/201, 207, 379/219, 220, 221, 222, 229, 230

[56] References Cited

U.S. PATENT DOCUMENTS

| | | | |
|---|---|---|---|
| 4,555,594 | 11/1985 | Friedes et al. | 379/220 |
| 4,565,903 | 1/1986 | Riley | 379/201 X |
| 4,791,665 | 12/1988 | Bogart et al. | 379/221 X |
| 5,553,129 | 9/1996 | Partridge, III | 379/220 |
| 5,901,213 | 5/1999 | Benhabib et al. | 379/219 X |

*Primary Examiner*—Harry S. Hong

[57] ABSTRACT

Disclosed is a capability for differentiated in-network or off-network call treatment (e.g., different call features or services) on a per-call basis using the value of the carrier identification code (CIC) passed from an access provider to a second carrier in a call set-up message associated with an incoming call. In addition, the caller selection information (CSI) parameter may be used in conjunction with the CIC to provide differentiated call treatment. The CIC and CSI parameters together provide information about the call and the caller which can be used for, e.g., directed marketing activities aimed at non-presubscribed callers using the second carrier's network on a per-call basis.

20 Claims, 3 Drawing Sheets

METHOD OF USING CARRIER INFORMATION FOR ENHANCED CALL DATA PROCESSING BY A TELECOMMUNICATIONS PROVIDER

FIELD OF THE INVENTION

The present invention relates generally to telecommunications networks, and more particularly to enhanced treatment of a call by a telecommunications provider through the use of carrier identification information associated with the call.

BACKGROUND DESCRIPTION

In the U.S., telephone service is provided by multiple providers or carriers. Some calls are handled by one service provider, e.g., a local call completed between two wired telephone stations. Other calls, e.g., long-distance calls, can require multiple service providers to cooperate for their completion.

The initial carrier providing telephone service is a local service provider. Examples of such providers include a local exchange carrier (LEC), a cellular (wireless) carrier, cable and any other so-called "dial-tone provider" or "first contact service provider." The second carrier, in one example, is a long-distance—or so-called interexchange—telephone carrier. For example, presently, for a long-distance telephone call between wired telephone subscribers, the local service providers serving the calling and called telephones are LECs which are interconnected by a long-distance, or interexchange, carrier (IXC). In the U.S., AT&T is one of several IXCs.

In another example, the second carrier may be a LEC. For instance, for a local call from a mobile telephone to a wired telephone station, the local service provider is a cellular service provider and the second carrier could be a LEC that is connecting the network of the cellular service provider to a called party at the wired telephone station. Thus, it is possible for a telecommunications carrier, such as the LEC in the above two examples, to serve multiple roles, e.g., being the local service provider for some calls while being a second carrier for other calls.

Each telephone subscriber of a local service provider has associated with his or her telephone service one or more presubscribed default second carriers that were selected by or for the subscriber. One of these presubscribed default second carriers carries multiple-carrier calls originated from the subscriber's telephone unless the local service provider is instructed otherwise by way of the call-by-call entry of a telecommunications carrier access code indicating which telecommunications carrier should carry the particular call. For any call for which a telecommunications carrier code is not entered, the appropriate presubscribed default second carrier is typically identified based on the particular telephone link—e.g., wired telephone line, wireless (cellular), fiber optic or cable connection (or any other link provided to connect telephones to local service providers)—on which the local service provider received the call.

To facilitate the handling of long distance calls, each subscriber receiving local telephone service from a LEC has associated with his or her telephone line a "primary interexchange carrier," or PIC. The local subscriber is said to be "PIC'd", or presubscribed, to the associated IXC. The interexchange carrier to which a subscriber is presubscribed will be used by default to complete interexchange calls originated from his telephone lines unless the LEC is instructed otherwise. Such instruction is given when the subscriber enters, on a call-by-call basis, prior to dialing the called telephone number, a telecommunications carrier access code corresponding to the desired IXC. One such carrier access code is "10288" (1-0-A-T-T) corresponding to AT&T.

Specifically, when a long-distance call is initiated by the subscriber from his telephone line, and no access code is entered prior to the dialing of the called telephone number, the call is routed through the network of the originating subscriber's LEC, over the network of the presubscribed IXC and, ultimately through the network of the LEC which has as one of its subscribers the terminating subscriber. Alternatively, a subscriber may initiate a long-distance call by dialing, prior to supplying the called telephone number, a carrier access code that indicates which IXC he wishes to carry his call. When the LEC switch that serves the caller receives the carrier access code, it is recognized that the caller wishes his call to be carried over the IXC corresponding to the received carrier access code. Accordingly, the LEC routes the caller's call to a trunk-subgroup connecting the LEC to the IXC indicated by the carrier access code, regardless of the IXC to which the caller's telephone line is presubscribed.

It is noted that the supplying of a carrier access code typically indicates the selection by the caller of an IXC other than the one to which he is presubscribed (i.e., indicates that the caller "dialed around" his presubscribed carrier), but occasionally it may indicate the same IXC to which the caller is presubscribed. Information as to whether or not a caller who is routed to a particular IXC is presubscribed to that IXC is contained in a carrier selection information (CSI) parameter, included in the call signaling information.

Regardless of whether a caller uses a carrier access code to reach a particular IXC or is simply routed to the IXC to which he or she is presubscribed, a carrier identification code (CIC) designating the intended IXC for the call is included, according to, e.g., the ISDN user part (ISUP) CCSS7 protocol, in the call signaling information generated by the access provider. The CIC is used by the access provider to route calls to the correct IXC. Each CIC is unique to a particular IXC, although a given IXC may have more than one associated CIC. AT&T, for example, owns the 288, 686, and 732 carrier identification codes, among others.

It is known to those skilled in the art that CIC information, passed between access and long distance providers, can be used to route calls with different CICs on combined trunks, thereby realizing trunk savings. This is due to the fact that in the absence of per-call CIC information, network providers would have to maintain separate trunks between their networks to distinguish between individual CIC codes. This potential cost savings provides an incentive to network providers to negotiate with other network providers for the passing of per-call CIC information.

SUMMARY OF THE INVENTION

While CICs have traditionally been used by local access carriers for identifying a second carrier (e.g., IXC) to which a particular call is to be forwarded, many second carriers now have multiple CICs associated with them, each usually associated with different classes of service. Thus, the CIC may also be used by the second carrier as a per call identification mechanism for, e.g., provision of differentiated call treatment based upon the CIC associated with the call. The present invention provides a per call differentiation capability and concomitant differentiated call treatment based upon the value of the CIC passed to the second carrier in the call set-up message.

According to one embodiment of the present invention, the CSI parameter is used in conjunction with the CIC to derive unique information about the caller and the call, allowing a differentiated call treatment for the call. The differentiated call treatment might include, for example, individualized greeting announcements, preferred call processing, switching on and off of signal processing in the network, among many others.

According to a second embodiment of the present invention, the CIC and CSI are combined to provide for powerful off-network processing of call and caller related information, such as for marketing, special billing, or advertising purposes, among others.

DETAILED DESCRIPTION

Figure 1:
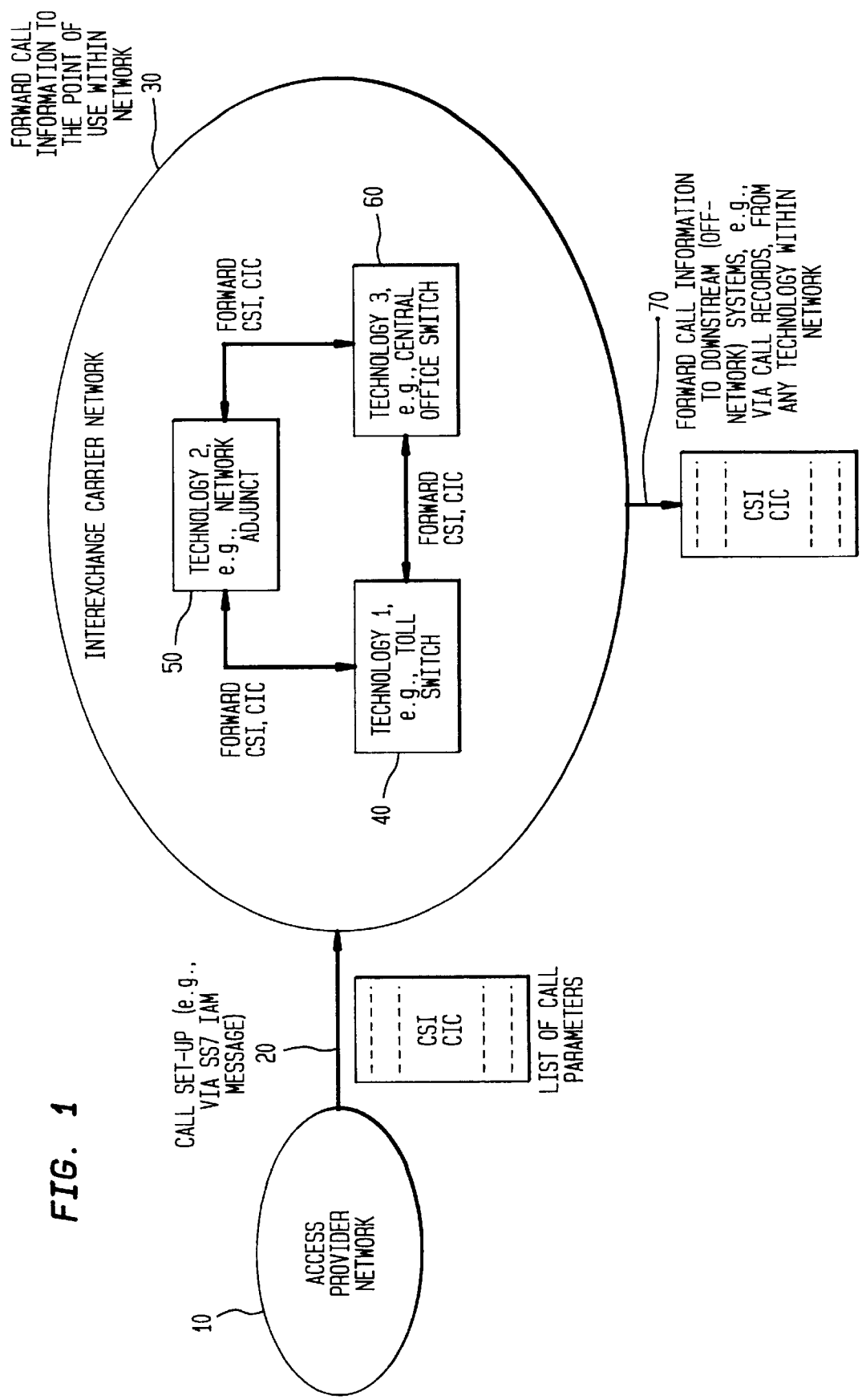
FIG. 1 is an information flow diagram depicting the transmission of the CIC and/or CSI parameters to various points of use within a second carrier network, as well as to downstream systems of the second carrier, according to one embodiment of the present invention.

In accordance with the present invention, the CIC for a call routed from a first carrier (e.g., a LEC) to a second carrier such as, e.g., an IXC, can be used to provide differentiated in-network or off-network call treatment, such as differentiated call services and/or features, on a per call basis.

The routing of signaling (e.g., call set-up) information, including CICS, from an access provider to a second carrier, as well as routing of such information within the second carrier's telecommunications network, will be understood by those skilled in the art. One example of a signaling protocol which may be employed in practicing the present invention is the common channel signaling system 7 (CCSS7) protocol, described in ANSI Standard T1.113, ISDN User Part.

The present invention makes use of the CIC in nontraditional ways, as a per call identification mechanism which can be correlated with various, differentiated call treatments (e.g., different branding or announcement) in the second network, or by supplemental (or "off-network") systems connected thereto. The CIC, which heretofore primarily has been used by access providers as a local parameter which provides "intercarrier" information (denoting the second carrier to which a particular call is to be routed), is used, according to the present invention, as an "intracarrier" means for providing differentiated call treatment.

There are a wide variety of call treatments that can be provided by a second carrier (such as an IXC) based on the CIC value, in accordance with the present invention. For example, a particular CIC can be assigned for use with "high priority" services and service customers. In this scenario, when a call with a "high priority" CIC is received by the second carrier, different intra-network call routing or different call branding, for example, may be provided.

"High priority" routing based upon the CIC is just one example of a CIC-based differentiated call treatment that can be provided in accordance with the present invention. There are a wide variety of other call treatments (like a different branding, mentioned above) that can be implemented based upon CIC value, as well.

In one embodiment of the present invention, the CIC is used in conjunction with the CSI parameter to provide differentiated call treatment, such as new value added or enhanced services. As discussed above, the CSI provides information about whether the second carrier was chosen as a result of "dialing around" by the caller or because the caller is presubscribed to the second carrier. The CIC and CSI together can provide valuable information about a call and caller, which may be used in the second carrier's network to identify callers based on their specific use of the IXC network, and, for example, to play specific greeting announcements, to provide or not provide special signal processing in the network, or to allow special features for individual calls, among others. Those skilled in the art will appreciate that the implementation of this method is not limited to any one technology in the network. Rather, it can be realized through the use of a variety of technologies, such as network switches, network adjuncts, directories, etc.

"High priority" routing within the carrier's network was discussed above as an example of a call treatment that may be implemented by a carrier in accordance with the present invention. Further examples of network-type call treatments that may be implemented by a carrier on the basis of the CIC, or the CIC in conjunction with the CSI, on a per-call basis in accordance with the present invention include playing selected automated greetings, allowing or disabling access to certain network resources, allowing or disabling certain features for dial-around versus presubscribed customers, informing operators about the nature of the caller/call (and providing differentiated operator greetings or services accordingly), providing differentiated routing through the carrier's network on the basis of the CIC and/or CSI, etc.

In addition to network-type call treatments that may be implemented based on the CIC and/or CSI, there are a wide variety of off-network call treatments that may be implemented as well. "Off-network call treatments" refers to those call treatments which are implemented in or by "downstream" systems, i.e., systems that are external to the carrier's telecommunications network. Such downstream systems include, e.g., marketing systems, customer care systems, research and development systems, etc. An example of an off-network call treatment according to the present invention is directed marketing aimed at callers who used a particular service of the carrier (as evidenced by the CIC associated with the calls) but who are not presubscribed customers of the carrier (as determined from the CSI parameter).

Directed marketing and other downstream activities may make use of another parameter passed with the call set-up information to the second carrier, in addition to the CIC and/or CSI parameters. This parameter is called the automatic number identification (ANI) parameter, and provides information as to the phone number of the calling party, which can, in turn, be used to determine the name and address of the customer from whose telephone a call is being placed. Those skilled in the art will easily appreciate that the information contained in the CIC, CSI and/or ANI can easily be sent to off-network systems (such as billing or marketing databases, among others), either stand-alone or in combination, using existing technology. As an example, the information could be extracted from signaling information for the call, and transcribed to call recording messages. Those call recording messages would then be read by off-network systems to obtain the CIC/CSI/ANI information.

Provision of various of the wide variety of call treatments which may be implemented in accordance with the present invention may require determining the CIC and/or CSI values only at the call's entry point into the second carrier's network (e.g., an IXC's originating switch). However, other CIC- and/or CSI-based call treatments may require passing the CIC and/or CSI parameters to one or more other points of use within the second carrier's network, as well as, perhaps, to downstream systems. One example of a call treatment which requires transmission of the CIC and/or CSI past the entry point of the second carrier's network is the provision of a carrier specific egress mechanism, at the second carrier's terminating switch, based upon the value of the CIC.

Figure 2:
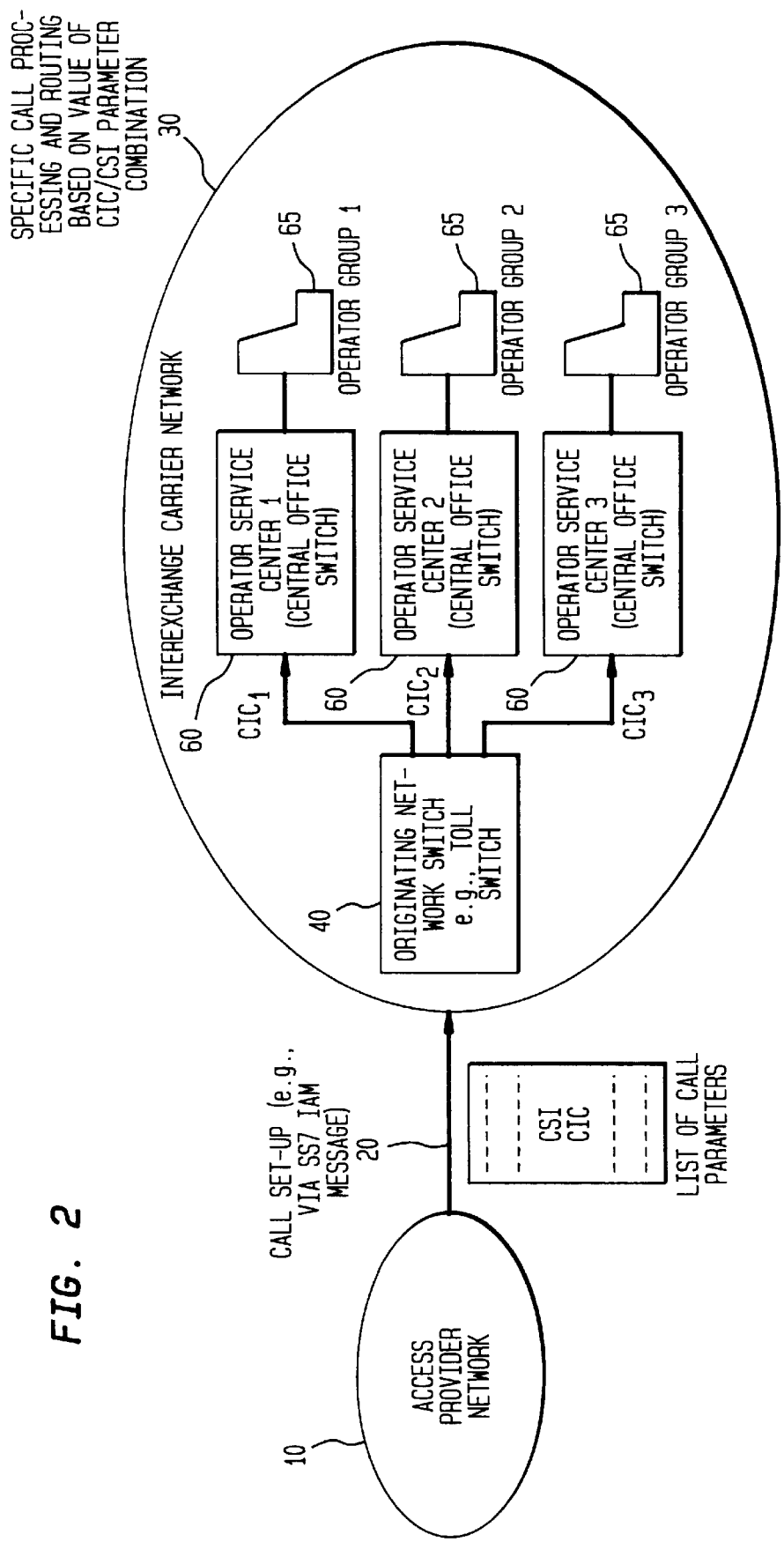
FIG. 2 depicts an exemplary use of the CIC parameter within a second carrier network for provision of differentiated call treatment (e.g., different operator services) based upon the CIC value according to one embodiment of the present invention.
Figure 3:
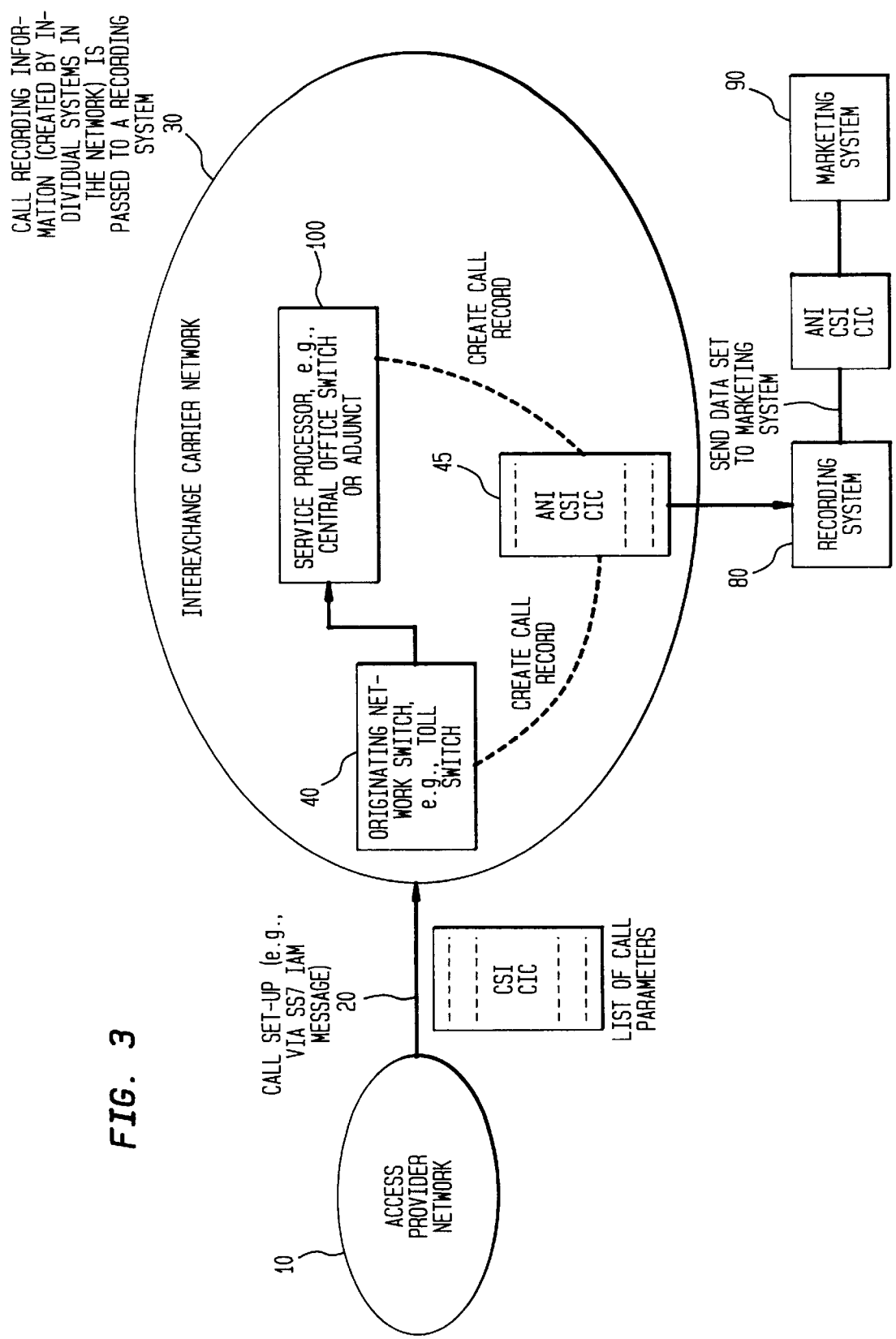
FIG. 3 depicts an exemplary use of the CIC and CSI parameters for the provision of off-network call services (e.g., directed marketing) by a second carrier according to one embodiment of the present invention.

FIGS. 1 through 3 illustrate the use of the CIC and/or CSI parameters, passed from an access provider to a second carrier (such as an IXC), for the provision of differentiated call treatments in accordance with various embodiments of the present invention.

FIG. 1 is an information flow diagram depicting the transmission, according to one embodiment of the present invention, of the CIC and CSI parameters from an access provider network 10 (e.g., a LEC) to a second carrier network 30 (e.g., an IXC) as well as to various nodes within the second carrier network 30 and to the second carrier's downstream systems 70. When an access provider 10 receives a call destined for a particular second carrier 30, the access provider 10 generates call set-up information 20 (such as, e.g., a CCSS7 initial address message) containing a variety of call-related parameters, including the CIC and/or CSI, and forwards the call setup information 20 to the second carrier 30.

The second carrier 30, in turn, forwards the CIC and/or CSI information to one or more points of use within the second carrier's network 30. The point(s) of use might include, e.g., a toll switch 40, an adjunct 50, or a central office switch 60 (such as, e.g., a central office operator services positioning system switch). In addition, the CIC and/or CSI information might, in accordance with the present invention, be forwarded to one or more downstream systems 70, such as marketing or customer care information databases.

FIG. 2 depicts an exemplary use of the CIC parameter within a second carrier network for provision of differentiated call treatment (e.g., different operator services) based upon the CIC value according to one embodiment of the present invention. The CIC is passed by an access provider network 10, via the call set-up information 20, to a second carrier network 30. Based upon the CIC value, as determined at the second carrier's originating network switch (e.g., toll switch) 40, the call is forwarded to the appropriate central office switch 60, where the appropriate operator group 65 services the call.

FIG. 3 depicts an exemplary use of the CIC and CSI parameters for the provision of off-network call services (e.g., directed marketing) by a second carrier according to one embodiment of the present invention. The CIC and CSI are passed by an access provider network 10, via the call set-up information 20, to a second carrier network 30. A call record 45, containing the CIC, CSI and ANI, is generated within the second carrier network 30 at, e.g., an originating (e.g., toll) network switch 40 or a service processing node 100 (e.g., a central office switch or an adjunct). The call record 45 is then transmitted to a downstream recording system 80, where the ANI, CSI and CIC, and any other information relevant to marketing activities, are extracted and sent to a marketing system database 90.

Although various embodiments are specifically illustrated and described herein, it will be appreciated that modifications and variations of the present invention are covered by the above teachings and within the purview of the appended claims without departing from the spirit and intended scope of the invention. For example, the CIC and/or CSI may be used, on a per call basis, to provide a wide variety of network-based or off-network call treatments by a second carrier. The present discussion lists a number of specific examples of such possible call treatments; however, the list included herein is not exhaustive.

What is claimed is:

1. A method for processing, in a first network, a call originating in a second network and having an associated carrier identification code, the method comprising the steps of:

(A) receiving, in the first network, the call and the associated carrier identification code from the second network;

(B) determining, in the first network, the value of the carrier identification code associated with the call, independent of how the call was received from the second network;

(C) establishing a desired call treatment based upon the determined value of the carrier identification code; and (D) providing the desired call treatment.

2. The method according to claim 1 wherein the first network includes a plurality of nodes, and wherein the call and the associated carrier identification code are received at a first node of the first network.

3. The method according to claim 2, further comprising the step of:

(E) forwarding the received carrier identification code to a second node of the first network.

4. The method according to claim 3, wherein the first node is a toll switch.

5. The method according to claim 3, wherein the second node is an adjunct.

6. The method according to claim 3, wherein the second node is a central office switch.

7. The method according to claim 1, wherein the first network is coupled to a downstream system, and wherein provision of the call treatment occurs in the downstream system, further comprising the step of:

(E) prior to provision of the call treatment, forwarding the received carrier identification code to the downstream system.

8. The method according to claim 1, wherein the downstream system is comprised of a recording system and a marketing system.

9. A method for processing, in a first telecommunications system, a call originating in a second telecommunications system, the call having an associated carrier identification code, an associated carrier selection information parameter, and an associated automatic number identification parameter, the first telecommunications system comprised of a telecommunications network coupled to a downstream system, the method comprising the steps of:

(A) receiving, from the second telecommunications system, the call and the associated carrier identification code, automatic number identification parameter and carrier selection information parameter at the telecommunications network of the first telecommunications system;

(B) generating a call record which includes the carrier identification code, carrier selection information parameter and automatic number identification parameter; and (C) forwarding the call record to the downstream system of the first telecommunications system.

10. The method according to claim 9, wherein the downstream system is comprised of a recording system and a marketing system.

11. The method according to claim 10, wherein the call record is forwarded to the recording system, further comprising the steps of:

(D) forwarding the call record to the marketing system; and (E) generating directed marketing materials from the call record.

12. The method according to claim 1, wherein the first network is an interexchange carrier system and the second network is an access provider system.

13. The method according to claim 1, wherein the first network includes specialized network resources and wherein the call treatment is CIC-based access to the specialized network resources.

14. The method according to claim 1, wherein the first network includes operator services and wherein the call treatment is CIC-based access to the operator services.

15. A method for processing, in a first telecommunications network, a call received from a second telecommunications network, the call having an associated carrier identification code and an associated carrier selection information parameter, the method comprising the steps of:

(A) receiving, from the second telecommunications network, the call and the associated carrier identification code and carrier selection information parameter;

(B) determining the values of the carrier identification code and carrier selection information parameter independent of how the call was received from the second telecommunications network;

(C) establishing a desired call treatment based upon the determined values of the carrier identification code and carrier selection information parameter; and (D) providing the desired call treatment.

16. The method according to claim 15 wherein the first telecommunications network includes a plurality of nodes, and wherein the call and the associated carrier identification code and carrier selection information parameter are received at a first node of the first telecommunications network.

17. The method according to claim 16, further comprising the step of:

(D) forwarding the received carrier identification code and carrier selection information parameter to a second node of the first telecommunications network.

18. The method according to claim 17, wherein the first node is a local switch.

19. The method according to claim 17, wherein the second node is an adjunct.

20. The method according to claim 17, wherein the second node is a central office switch.

* * * * *